United States Patent
Phan Le

(10) Patent No.: US 10,872,618 B2
(45) Date of Patent: Dec. 22, 2020

(54) MOBILE DEVICE LOCATOR

(71) Applicant: NXP B.V., Eindhoven (NL)

(72) Inventor: Kim Phan Le, Eindhoven (NL)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 16/691,770

(22) Filed: Nov. 22, 2019

(65) Prior Publication Data

US 2020/0202884 A1    Jun. 25, 2020

(30) Foreign Application Priority Data

Dec. 19, 2018 (EP) .................................... 18214251

(51) Int. Cl.
| | | |
|---|---|---|
| G10L 25/51 | (2013.01) | |
| G01S 5/26 | (2006.01) | |
| H04R 1/02 | (2006.01) | |
| H04R 3/12 | (2006.01) | |
| H04R 5/02 | (2006.01) | |
| H04S 1/00 | (2006.01) | |

(52) U.S. Cl.
CPC ............. *G10L 25/51* (2013.01); *G01S 5/26* (2013.01); *H04R 1/025* (2013.01); *H04R 3/12* (2013.01); *H04R 5/02* (2013.01); *H04S 1/007* (2013.01); *H04R 2499/11* (2013.01); *H04R 2499/13* (2013.01)

(58) Field of Classification Search
CPC ... H04S 2400/11; H04R 2499/13; H04R 5/02; H04R 2205/024; G10K 2210/111
USPC .......................................... 381/86, 303, 304
See application file for complete search history.

(56) References Cited

U.S. PATENT DOCUMENTS

| | | | |
|---|---|---|---|
| 7,856,203 B2 | 12/2010 | Lipovski | |
| 2012/0214544 A1* | 8/2012 | Shivappa | H04R 29/007 455/556.1 |
| 2013/0336094 A1 | 12/2013 | Gruteser et al. | |
| 2014/0161280 A1* | 6/2014 | Nackvi | H04S 7/307 381/98 |
| 2014/0364153 A1 | 12/2014 | Ren | |
| 2018/0252796 A1 | 9/2018 | Qu et al. | |

FOREIGN PATENT DOCUMENTS

EP         2708910 A1     3/2014

* cited by examiner

*Primary Examiner* — George C Monikang

(57) ABSTRACT

A method and apparatus of determining the position of a mobile device in a region of a vehicle cabin are described. The mobile device has a speaker and at least one microphone. The vehicle has an audio system comprising at least two speakers. The mobile device detects first and second acoustic signals respectively transmitted via the first and second vehicle speaker. The acoustic signals comprise a respective detection pattern. The detection patterns are mutually orthogonal. The detected acoustic signals may be compared or correlated with the detection patterns and a respective matched acoustic signal generated. The location of the mobile device within a region of the vehicle cabin may be determined based on the time difference of arrival of the first matched acoustic signal and the second matched acoustic signal. The mode of operation of the mobile device may be set or changed dependent on the location of the mobile device.

20 Claims, 6 Drawing Sheets

MOBILE DEVICE LOCATOR

CROSS-REFERENCE TO RELATED APPLICATIONS

This application claims the priority under 35 U.S.C. § 119 of European Patent application no. 18214251.3, filed on 19 Dec. 2018, the contents of which are incorporated by reference herein.

FIELD

This disclosure relates to a method and apparatus for determining a location of a mobile device in a vehicle.

BACKGROUND

Mobile devices such as smartphones may often be used be occupants in a vehicle. However, using many smartphone apps while driving is considered extremely dangerous and is strictly forbidden in many countries. Besides legal measures, new technologies have been implemented to prevent texting during driving.

SUMMARY

Various aspects of the disclosure are defined in the accompanying claims. In a first aspect there is provided a mobile device locator configured to be included in a mobile device, the mobile device locator comprising: a correlator configured to: receive first and second acoustic signals respectively transmitted via first and second speakers located in a vehicle cabin; compare the detected first and second acoustic signals with respective predetermined first and second detection patterns; and to output a respective first matched acoustic signal and a second matched acoustic signal, wherein the first detection pattern and the second detection pattern are mutually orthogonal; a time difference of arrival module coupled to the correlator output and configured to determine a time difference of arrival between the first matched acoustic signal and the second matched acoustic signal; and a location region indicator coupled to the time difference of arrival module and configured to determine a location of the mobile device within a region of the vehicle cabin based on the determined time difference of arrival and to output a mobile device operating mode signal dependent on the determined mobile device location.

In one or more embodiments the mobile device locator may comprise a received signal strength indicator coupled to the correlator and the location region indicator and configured to determine a received signal strength of the first and second acoustic detection patterns from the first matched acoustic signal and the second matched acoustic signal; and wherein the mobile device locator is further configured to determine the mobile device location based on the received signal strength and the time difference of arrival of the first and second acoustic detection patterns.

In one or more embodiments the time difference of arrival module may be configured to determine a first time value from a cross-correlation of the first acoustic signal and the first detection pattern; and determine a second time value from a cross-correlation of the second acoustic signal and the second detection pattern; and determine the difference between the first time value and the second time value.

In one or more embodiments the time difference of arrival module may be configured to determine the difference between the first time value and the second time value and a time offset value corresponding to the delay between transmitting the first detection pattern and the second detection pattern.

In one or more embodiments the location indicator may be configured to determine the region of the cabin where the mobile device is located by determining a distance value corresponding to the time difference of arrival multiplied by half the speed of sound.

In one or more embodiments the correlator may be configured to detect a check detection pattern included in a check acoustic signal transmitted by the mobile device; the received signal strength indicator is configured to determine a received signal strength of the check detection pattern and the location indicator is configured to indicate a fault in response to the received signal strength of the check detection pattern being below a predetermined threshold value.

One or more embodiments of the mobile device locator may be included in mobile device comprising at least one microphone. The at least one microphone may be coupled to the mobile device locator and the mobile device may be configured to set a mobile device mode of operation dependent on the mobile device operating mode signal.

In a second aspect there is provided an audio system for a vehicle, the audio system being configured to transmit an acoustic signal for determining the location of a mobile device in a vehicle cabin and comprising: an audio processor configured to output a first audio signal to a first of a pair of stereo speakers and a second audio signal to a second of a pair of stereo speakers; a detection pattern generator; a vehicle speed sensor input configured to receive a vehicle speed value; wherein the detection pattern generator is configured to generate a first acoustic detection pattern and a second acoustic detection pattern, the first acoustic detection pattern and the second acoustic detection pattern being mutually orthogonal; and wherein in response to the vehicle speed value exceeding a predetermined threshold, the audio system is configured to combine the first detection pattern with the first audio signal and combine the second detection pattern with the second audio signal and to output a first acoustic signal comprising the first acoustic detection pattern and the first audio signal via a first of a pair of stereo speakers and a second acoustic signal comprising the second acoustic detection pattern and the second audio signal via a second of a pair of stereo speakers.

In one or more embodiments the first acoustic detection pattern and the second acoustic detection pattern may comprise a pseudo random pattern having a respective first maximal length sequence and second maximal length sequence.

In one or more embodiments of the audio system, the first acoustic detection pattern and the second acoustic detection pattern may be generated sequentially with a predetermined time offset.

In one or more embodiments the detection pattern generator may comprise a series arrangement of a pseudo random number generator, an up-sampler and a Hilbert transformer, wherein the output of the Hilbert transformer is coupled to a first mixer input and a carrier signal generator is coupled to the second signal input and wherein the detection pattern generator output is coupled to the mixer output.

In one or more embodiments, the audio system may further comprise a microphone input coupled to the pattern generator and configured to be coupled to a microphone located in the vehicle cabin. The audio system may be configured to alter the amplitude of the first detection pattern and the second detection pattern dependent on the detected ambient noise level of the vehicle cabin In one or more embodiments, the audio system may further comprise a microphone input coupled to the pattern generator and configured to be coupled to a microphone located in the vehicle cabin, wherein the pattern generator is further configured to compare the generated patterns with a detected acoustic signal comprising the detected patterns and to generate a signal indicating an error condition in response to the signal strength of the detected patterns being below a predetermined threshold.

Embodiments of the mobile device locator and the audio system may be included in an apparatus for determining the location of a mobile device within a region of a vehicle cabin.

In a third aspect there is provided a method of determining the position of a mobile device in a region of a vehicle cabin, the mobile device comprising a speaker and a microphone, the vehicle cabin comprising at least two speakers, the method comprising: detecting by the mobile device microphone first and second acoustic signals respectively transmitted via the first and second speaker, the first and acoustic signals comprising a respective first detection pattern and a second detection pattern, wherein the first detection pattern and the second detection pattern are mutually orthogonal; comparing the detected first and second acoustic signals with the respective predetermined first and second detection patterns and outputting a respective first matched acoustic signal and a second matched acoustic signal; determining a location of the mobile device within a region of the vehicle cabin based on the time difference of arrival of the first matched acoustic signal and the second matched acoustic signal; and setting the mode of operation of the mobile device dependent on the location of the mobile device.

BRIEF DESCRIPTION OF THE DRAWINGS

In the figures and description like reference numerals refer to like features. Embodiments of are now described in detail, by way of example only, illustrated by the accompanying drawings in which:

FIG. 4 illustrates a t according to an embodiment.

DETAILED DESCRIPTION OF EMBODIMENTS

Figure 1:
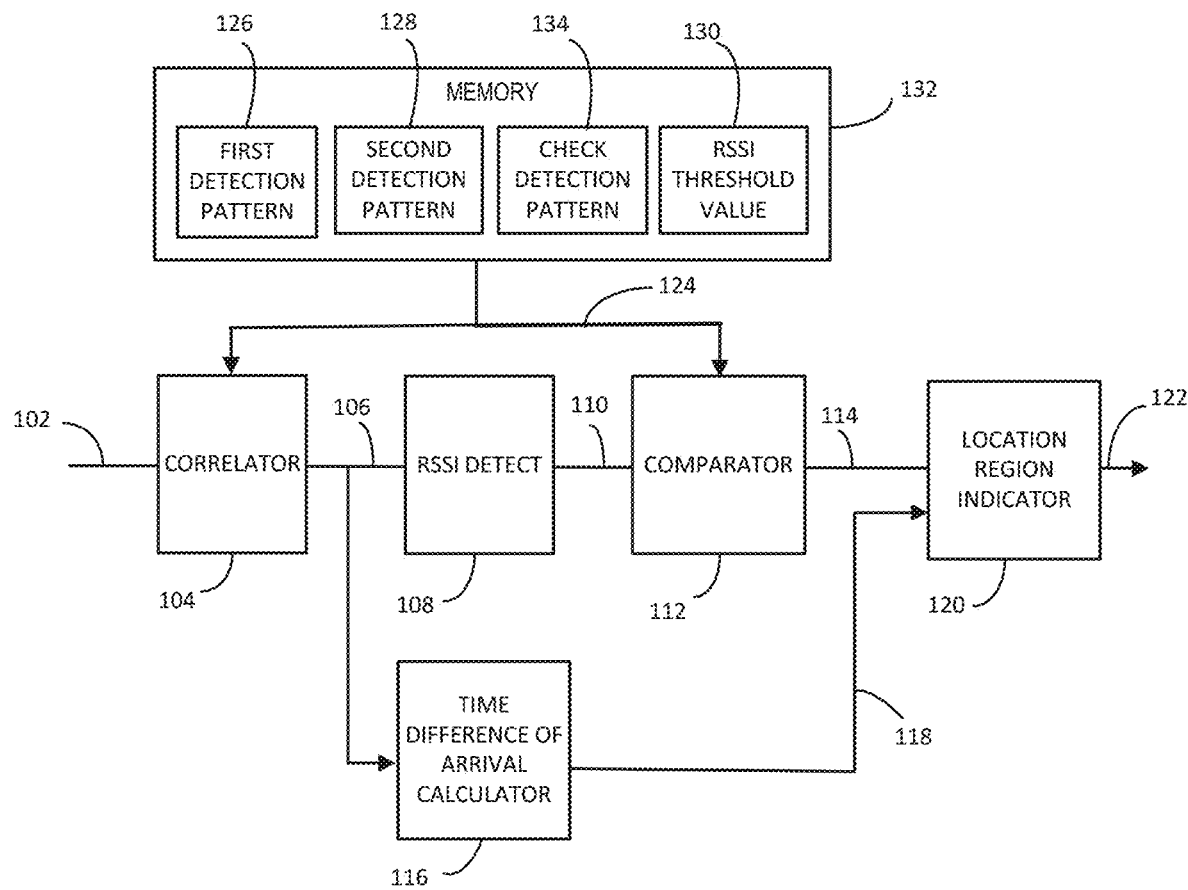
FIG. 1 shows a mobile device locator according to an embodiment.

FIG. 1 shows a mobile device locator 100 according to an embodiment. The mobile device locator 100 may have an acoustic input 102 connected to a correlator 104. A correlator output 106 may be connected to a received signal strength indicator (RSSI) 108, The correlator output 106 may be connected to a time difference of arrival (TDOA) calculator 116. The RSSI output 110 may be connected to a comparator 112. The comparator output 114 may be connected to a location region indicator 120, The TDOA output 118 may be connected to the location region indicator 120. The location region indicator 120 may output a signal indicative of the mobile device location within a region of a vehicle cabin on the location region indicator output 122. A memory 132 may include a first detection pattern 126 and a second detection pattern 128. The memory 132 may include a predetermined RSSI threshold value 130. A memory output 124 may be connected to the correlator 104 and the comparator 112. The memory 132 may include a check detection pattern 134.

Figure 2:
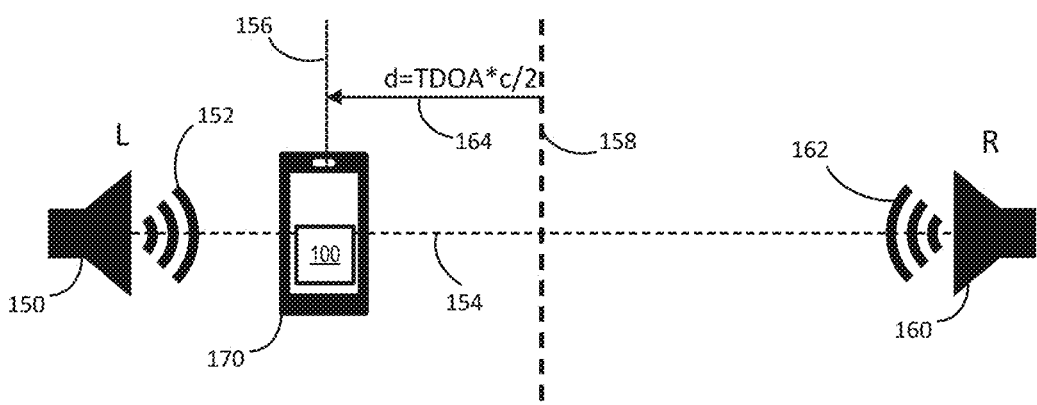
FIG. 2 illustrates an example of the operation of the mobile device locator of FIG. 1 when included in a smartphone.

The operation of the mobile device locator 100 may be understood with reference to FIG. 2 which shows a smartphone 170 including the mobile device locator 100. A first speaker 150 which may be the left speaker of a pair of stereo speakers located in a vehicle cabin may transmit a first acoustic signal 152 generated by an in-vehicle audio or infotainment system (not shown). The first acoustic signal 152 may include the first acoustic detection pattern corresponding to the first detection pattern 126 together with other audio content from an in-vehicle audio system (not shown). A second speaker 160 which may be the right speaker of a pair of stereo speakers located in a vehicle cabin may transmit a second acoustic signal 162 generated by an in-vehicle audio or infotainment system (not shown). The second acoustic signal 162 may include the second acoustic detection pattern corresponding to the second detection pattern 128 together with other audio content from the in-vehicle audio system (not shown).

The first acoustic signal 152 and the second acoustic signal 162 may be detected by one or more microphones (not shown) of the smartphone 170 which may be connected via interface circuitry (not shown) to the acoustic input 102 of the mobile device locator 100. The correlator 104 may correlate the first detection pattern 126 with the first acoustic signal 152 and the second detection pattern 128 with the second acoustic signal 162. The correlator 104 may be implemented as a match filter. In other examples, different correlation techniques may be used to determine whether the received signal contains the detection patterns. For example, a machine learning technique may be used similar to that used for voice recognition techniques. The output signal from the correlator output 106 may be received by the RSSI detector 108 which determines the strength of the first detection pattern and second detection pattern in the respective first acoustic signal 152 and the second acoustic signal 162. The comparator 112 may compare the RSSI value of the received first detection pattern and second detection pattern with a respective RSS threshold value 130 from the memory 132. The resulting comparison may be output on comparator output 114. The location region indicator 120 may determine an initial location region of the smartphone 170, for example front seats of a car or back seats of a car from the comparator output 114.

The inventor has appreciated that if the speakers are located in the front of the vehicle and the signal strength of both speakers is below a predefined level, the smartphone 170 is probably located in the rear of the vehicle cabin since the front seats may block the detection patterns. If the signal strength is larger than the threshold, the smartphone 170 is probably located in the front of the vehicle cabin. Conversely if the speakers are located in the rear of the vehicle cabin, and the signal strength of both speakers is below a predefined level, the smartphone 170 is probably located in the front of the vehicle cabin. In some examples, for example, for vehicles with no rear seats, the RSSI detector 108 may be omitted.

The output signal of the correlator 104 may be received by the TDOA calculator 116. The TDOA calculator 116 may determine the strongest cross-correlation results of received first detection pattern and second detection pattern. The strongest cross-correlation result may correspond to the line of sight or most direct path between the transmitted signal and the mobile device locator 100. The TDOA calculator 116 may determine only the difference in arrival times of the two patterns, regardless of their absolute arrival times. Consequently, there is no need for time synchronisation between the generated patterns transmitted by the first loudspeaker 150 and the second loudspeaker 160 and the mobile device locator 100. In some examples the two detection patterns may be transmitted sequentially with a time offset value, toffset. Knowing the time offset between transmissions of the two detection patterns, TDOA can be calculated according to the formula:

$$TDOA = tL - tR - toffset \quad (1)$$

where tL and tR are time delays of received patterns, contained in acoustic signal 152, and acoustic signal 162 respectively, which may be obtained from across-correlation applied by the correlator 104 and toffset is the transmission time offset between the two patterns. Where the first detection pattern and the second detection pattern are transmitted simultaneously, the time offset is zero and consequently $$TDOA = tL + tR \quad (2)$$

The inventor has further appreciated that in a vehicle cabin with two speakers located at either side, which is typically the case, the localization may be determined with sufficient accuracy by assuming the mobile device 100 is located on a line 154 between the two speakers. The distance d indicated by line 164 is defined as the signed distance from the middle position 158 between the speakers and the position 156 of the mobile device 100. When d<0, the phone is on the left side of the middle position 158, and when d>0, the phone is on the right side. Distance d is calculated from the TDOA value as follows:

$$d = TDOA * c/2; \text{ where } c \text{ is the speed of sound in air.} \quad (3)$$

From the result of the TDOA calculator 116, the location region detector 120 may determine a region of the vehicle corresponding to the different seats in which the mobile device 100 is located.

The output of the location region detector 120 may be used by the smartphone 170 to set the mode of operation dependent on the determined region. For example, if the mobile device 100 is a smartphone located in a region corresponding to the position of the driver, the mobile device 100 may set the mode of operation to lock or disable the screen. In other examples, if the smartphone 170 is subsequently detected to be in a passenger location, the smartphone 170 may enable the screen. In some examples, the smartphone 170 may enable or disable various software applications or features dependent on the location of the mobile device within the region of the vehicle cabin determined by the mobile device locator 100. Typical smartphone apps may detect whether a smartphone is moving with car speed for example using satellite navigation such as GNSS and lock the touch-screen. However, these apps do not distinguish between a phone held by the driver or by passengers in the same vehicle. Consequently, these apps may also block functionality of passengers sitting in moving vehicles.

The inventor of the present disclosure has appreciated that a vehicle audio system may be used together with a smartphone or other mobile device including the mobile device locator 100 in order to determine the location of the mobile device within a region of the vehicle cabin. In many vehicles audio speakers are located on the doors, or sometimes on the far left/right sides of the dashboard. There are at least 2 speakers at the front seats, or in most modern cars, there are 4 speakers on 4 side-doors.

The detection patterns may be ultrasonic, which may have frequencies above 18 kHz, or preferably in between 18.5 kHz and 22 kHz. The detection patterns may then be added to normal audio such as voice or music from a radio or CD player. The detection patterns may only be generated when the car is moving faster than a predefined speed.

Since ultrasound is not audible, there is no influence on the audio performance of the car audio system. Alternatively, the entire audio band from ~100 Hz to Fs/2 can be used for the detection patterns, where Fs is the sampling rate of the audio system. For consumer products Fs is either to 44.1 kHz, 48 kHz, or 96 kHz. In this case, amplitudes in the audio band, typically less than 18 kHz should be kept small such that they are masked by engine and road noise, and virtually not audible.

The first detection pattern and second detection pattern are mutually orthogonal such that their cross-correlations are minimum while their autocorrelations are maximum. Examples of such patterns are chirps, modulated pseudo-random noise sequences, modulated gold codes, etc. The modulation scheme can be any technique used in telecommunication, including but not limited to phase-shift keying, frequency-shift keying, and direct sequence spread spectrum.

The inventor has appreciated that even though vehicle speakers are specified within the audio range which may be between 20 Hz-20 kHz, they can transmit also ultrasound up to 40 kHz or more, to some extent. The audible range is typically up to 18 kHz or slightly higher. Therefore, ultrasound is inaudible when added to normal audio content such as voice or music and the quality of audio as perceived is not influenced. The ultrasound content when added to audio can still be transmitted to the air via normal speakers and detected by the mobile device locator 100 which may separate the ultrasound from audio and processes the ultrasound signal as described. The detection patterns may only be transmitted when the vehicle is moving above a predetermined speed. The mobile device locator 100 may be implemented by hardware, software or a combination of hardware and software, for example by software running on a digital signal processor (DSP) or other Microprocessor which typically includes memory for storing the predetermined first detection pattern 126, second detection pattern 128 and the RSSI threshold value 130. When included in a smart phone, the mobile device locator 100 may be integrated with another software application such as a texting app.

In some examples, the mobile device locator 100 may include a check detection pattern 134 corresponding to a pattern which is transmitted by the mobile device itself. The check detection pattern 134 may be different to the first and second detection patterns. The checking pattern 134 may be an ultrasound pattern. The duty-cycle of checking pattern may be a few seconds to a few tens of seconds. The correlator 104 may compare a detected signal with the check detection pattern 134. The RSSI detector 108 may determine a RSSI value of the check detection pattern 134. If the RSSI value of the received check detection pattern is below a threshold value, then the location region indicator 120 may indicate a fault. A mobile device including the mobile device locator may set the mode which displays a warning message or disables texting. In this way, the mobile device locator 100 may protect against tampering a mobile phone for example by blocking the microphone to inhibit safety features such as disabling texting when driving. In this case, the phone will receive a reduced level of sound from the first and second acoustic signal, which might escape the RSSI check. Consequently, the mobile device locator 100 may erroneously determine that the phone is on the rear seat, or outside the car, and consequently will not set an appropriate mode such as enabling a screen blocking action. In other examples, the check detection pattern 134 may be omitted.

The mobile device locator 100 includes a memory 132 for storing detection patterns and RSSI threshold values. It will be appreciated that in other examples, these values may be predetermined and included as part of the correlator and RSSI detector. In this case, the separate memory 132 may be omitted.

Figure 3:
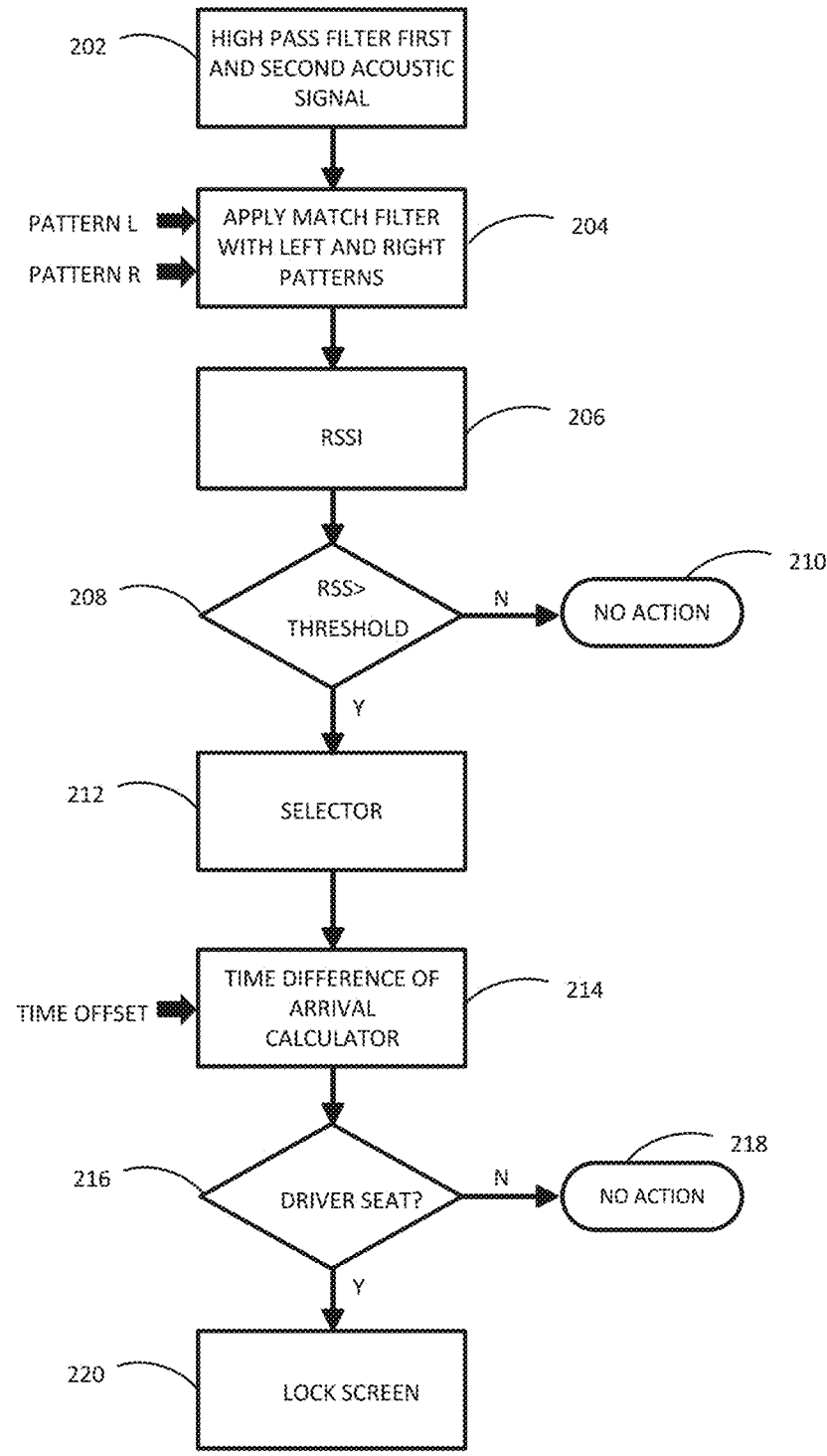
FIG. 3 shows a method of determining the location of a mobile device within region of a vehicle according to an embodiment.

FIG. 3 shows a method of determining the location of a mobile device 200 according to an embodiment. The mobile device includes a screen and one or more microphones or other acoustic transducer. In step 202 first and second acoustic signals transmitted from respective loudspeakers in the vehicle cabin may be received by the one or more microphones included in the mobile device. The signals received by the one or more microphones may be filtered using e.g. a high-pass filter (HPF), with a cut-off frequency just below the lower bound of the frequency band of the detection patterns which are transmitted at ultrasound frequencies. In this step 202, the audible signal is filtered out, leaving only the ultrasound signal to pass through.

In step 204 a matched filter (MF) is applied to the first and second acoustic signals. An example of a matched filter is the cross-correlation, where copies of the detection patterns, pattern L, pattern R, are provided as the inputs to the match filter and cross-correlated with the first and second acoustic signals. After step 204, the received ultrasound signals may be separated from noise and unwanted interferences, and delays of received signals can be calculated which will be used in step 214

In the next step 206, results from the MF step 204 may be used for determining signal strength, by applying a Received Signal Strength Indicator (RSSI).

In step 208, the RSSI values for each of the detection patterns may be compared against a threshold value. If the RSSI values are less than the threshold value, the mobile device location is determined to be at the rear of the vehicle cabin, and the method completes at step 210 with no further action. If the signal strength is larger than the threshold, the mobile device location is determined to be at the front of the vehicle cabin and the method proceeds further to the selection step 212. In the selection step 212, the strongest cross-correlation results of left and right patterns from the respective signals of the two microphones are selected, and the method proceeds to the Time-Difference-Of-Arrival (TDOA) step 214. TDOA is a method to calculate only the difference in arrival times of the two patterns, regardless their absolute arrival times. Therefore, in this way, there is no need for time synchronisation between the vehicle audio system and the mobile device.

In step 214, the TDOA value is calculated for example using equation (I) and the method moves to step 216. In some examples, the detection patterns may be sequentially transmitted with a predetermined time offset. In some examples, the detection patterns may be transmitted simultaneously. Based on the TDOA value, the method determines whether the mobile device is located in the region of the driver's seat. If the mobile device is not located in the driver seat region then the method moves to step 218 and no further action is taken. If the mobile device is located in the driver seat region, then the method moves to step 220 and the screen is locked. In other examples different actions may be taken, for example disabling various software applications or hardware features such as texting, video streaming or other applications that may distract a driver.

Figure 4:
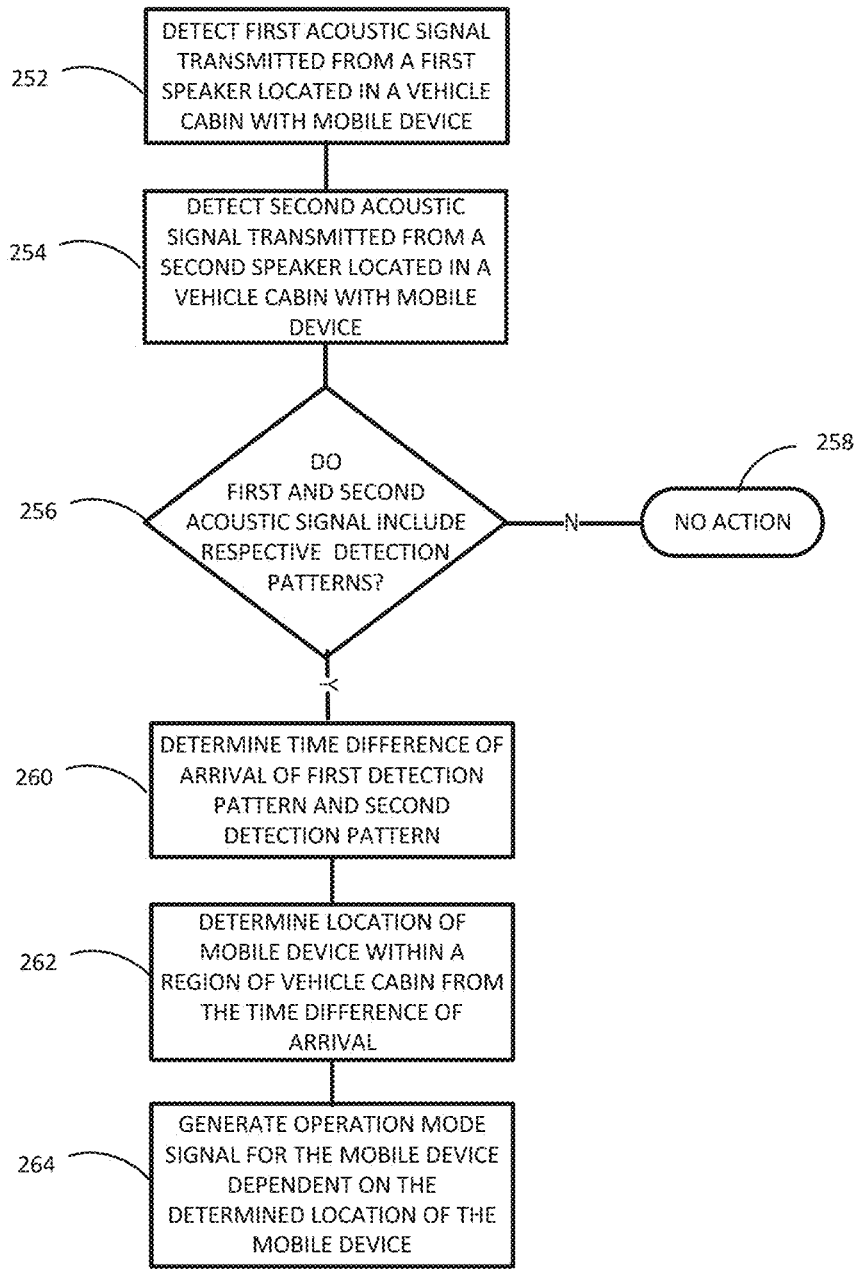
FIG. 4 illustrates a method of determining the location of a mobile device within a region of a vehicle according to an embodiment.

FIG. 4 illustrates a method of locating a mobile device in a vehicle cabin 250. In step 252 a first acoustic signal may be detected by a mobile device. The first acoustic signal may be transmitted from a first speaker located in a vehicle cabin. In step 254 a second acoustic signal may be detected by a mobile device. The mobile device may have one or more microphones. The second acoustic signal may be transmitted from a second speaker located in a vehicle cabin. In step 256 the method may check whether the first acoustic signal includes a first detection pattern and whether the second acoustic signal includes a second detection pattern using a match filter or some other method.

If both the first and second detection patterns are not detected, then the method proceeds to step 258 and no further action is taken. If both first and second detection patterns are detected, then the method proceeds to step 260.

Figure 5:
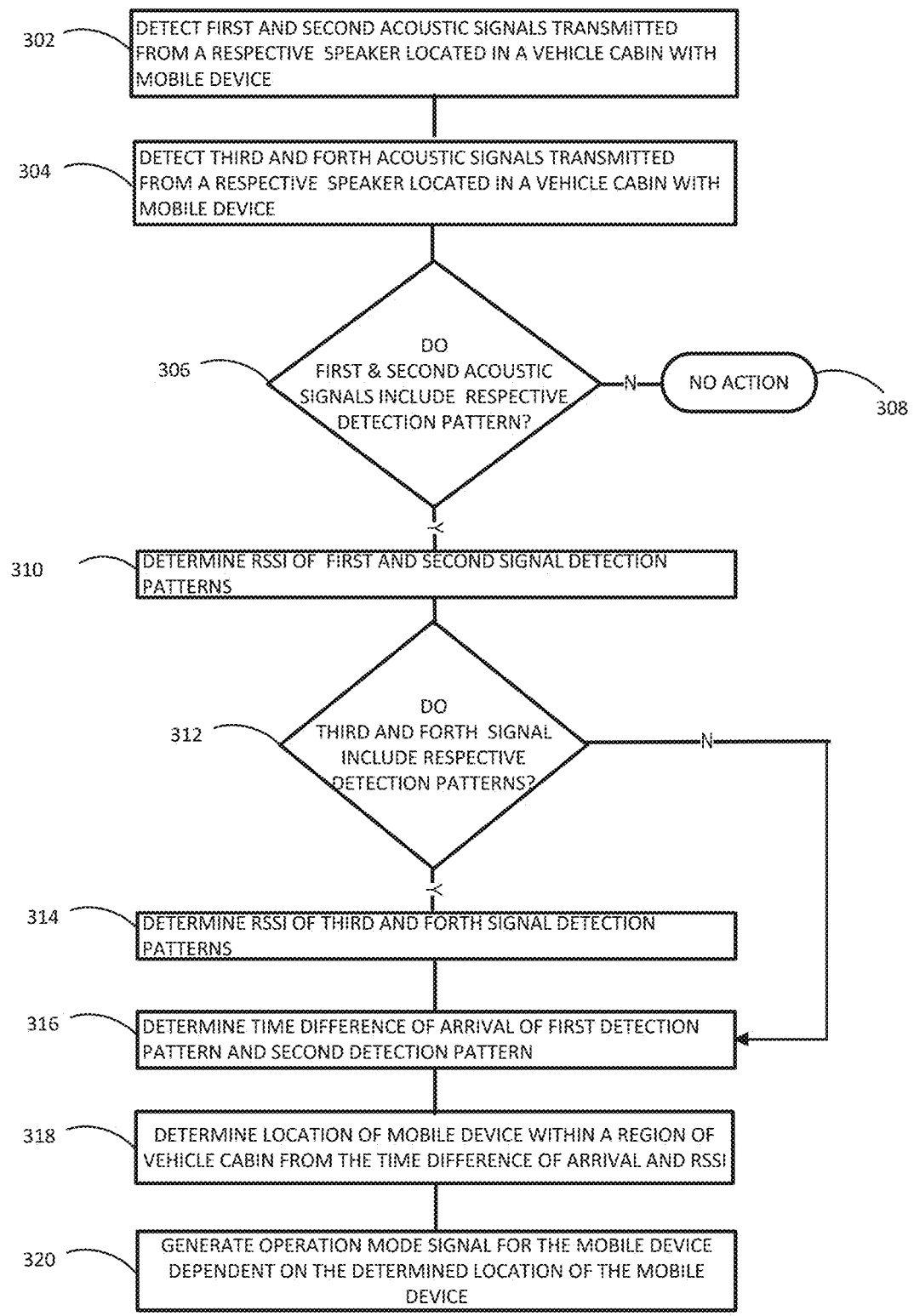
FIG. 5 shows a method of determining the location of a mobile device within a region of a vehicle according to an embodiment.

In step 260, a time difference of arrival of the first detection pattern and the second detection pattern may be determined. In step 262 a location of the mobile device within a region of the vehicle cabin may be determined using for example equations 1 to 3. In step 264 an operation mode signal may be generated dependent on the determined location. The mobile device may a mode of operation dependent on the operation mode signal FIG. 5 illustrates a method of locating a mobile device in a vehicle cabin 300. In step 302 a first acoustic signal and second acoustic signal may be detected by a mobile device. The first and second acoustic signals may be transmitted respectively by a pair of stereo speakers located in the front of a vehicle cabin. In step 304 a third acoustic signal and fourth acoustic signal may be detected by a mobile device. The third and fourth acoustic signals may be transmitted respectively by a pair of stereo speakers located in the rear of a vehicle cabin.

In step 306 the method may check whether the first acoustic signal includes a first detection pattern and the second acoustic signal includes a second detection pattern using a match filter or some other method. If the first and second acoustic signals do not respectively include the first and second detection patterns, then the method proceeds to step 308 and no further action is taken. If the first and second acoustic signals respectively include the first and second detection patterns, then the method proceeds to step 310. In step 310 a RSSI value may be determined for the first and second signal detection patterns.

The method 300 then proceeds to step 312 to check whether the third acoustic signal includes a third detection pattern and the fourth acoustic signal includes a fourth detection pattern using a match filter or some other method. If the third and fourth acoustic signals do not respectively include the third and fourth detection patterns, then the method proceeds to step 316 lithe third and fourth acoustic signals respectively include the third and fourth detection patterns, then the method proceeds to step 314.

In step 314 a RSSI value may be determined for each of the third and fourth detection patterns.

In step 316, a time difference of arrival of the first detection pattern and the second detection pattern may be determined. In some examples, alternatively or in addition a time difference of arrival of the third detection pattern and the fourth detection pattern may be determined.

In step 318 a location of the mobile device within a region of the vehicle cabin may be determined using for example equations 1 to 3 and the RSSI values. The RSSI values of the third and fourth detection patterns if detected may be used to more accurately determine whether the mobile device is located in the front or rear regions of the vehicle cabin.

In step 320 a mode of operation of the mobile device may be set dependent on the determined location.

Figure 6:
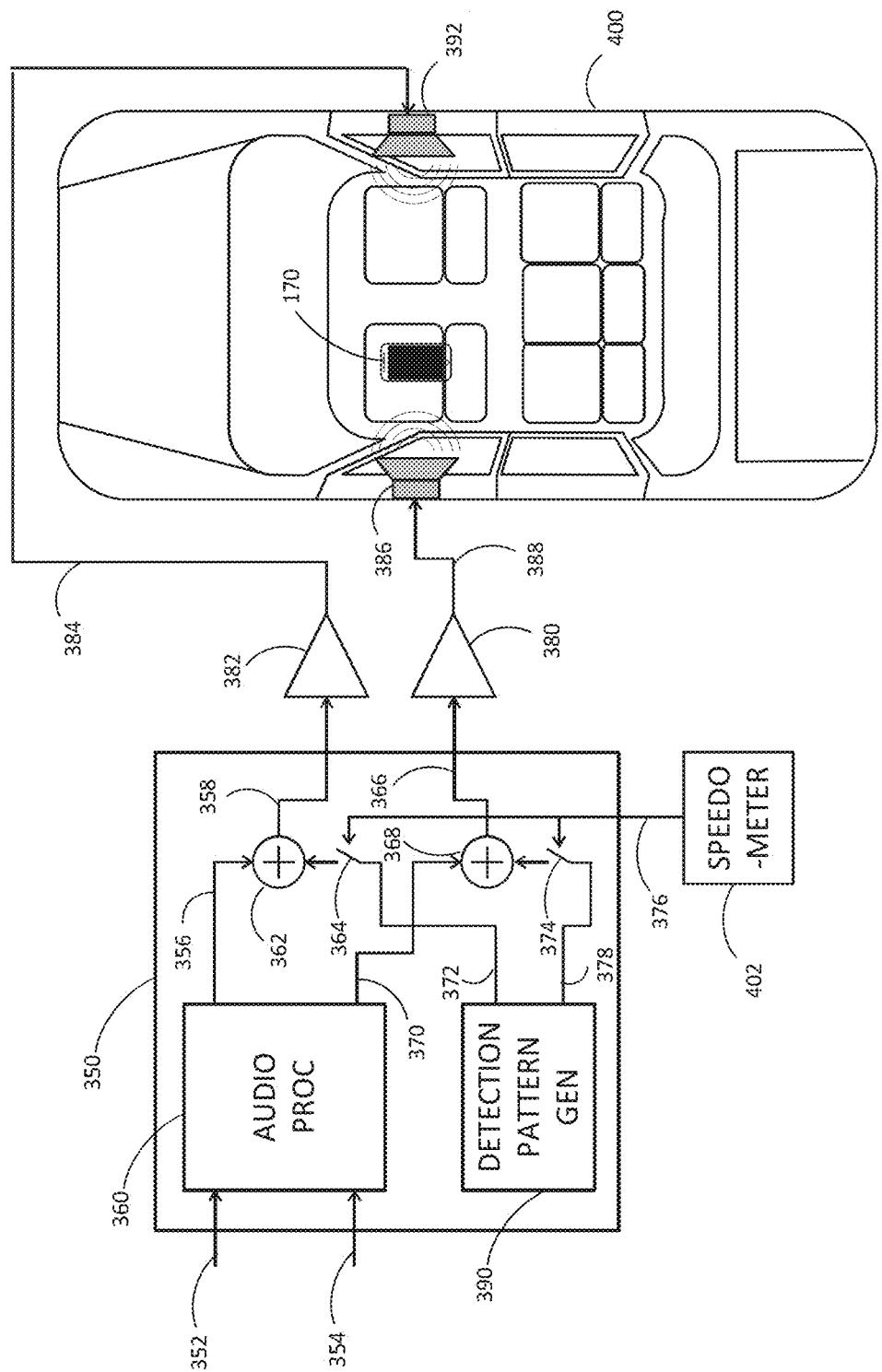
FIG. 6 shows an acoustic transmitter including a detection pattern generator for determining the location of a mobile device within a vehicle according to an embodiment

FIG. 6 shows an audio system 350 for locating a mobile device within a vehicle 400. The audio system 350 includes an audio processor 360, and a detection pattern generator 390. The audio processor 360 may receive a left channel audio input 354 and a right channel audio input 352. The audio processor 360 may have a left channel audio output 370 connected to a first input of a first audio adder or audio mixer 368 and a right channel audio output 356 connected to a first input of a second audio adder or audio mixer 362. The detection pattern generator 390 may have a first detection pattern output 378 connected to a second input of the first audio adder or audio mixer 368 via first switch 374. The detection pattern generator 390 may have a second detection pattern output 372 connected to a second input of the second audio adder or audio mixer 362 via second switch 364. The first switch 374 and the second switch 364 may be controlled by a speed sensor input 376.

In operation, the speed sensor input 376 may be connected to an output of the vehicle speedometer 402. The first audio mixer output 366 may be connected to an input of left channel speaker driver 380. The output 388 of the left channel speaker driver 380 may be connected to left speaker 386. The second audio mixer output 358 may be connected to an input of right channel speaker driver 382. The output 384 of the right channel speaker driver 382 may be connected to right speaker 392.

The audio system 350 may be part of an in-vehicle infotainment system. The audio processor 360 may receive audio sources on the left and right audio inputs 352, 354 and may process the signal for example by applying one or more of audio equalization, balance, or audio enhancement. The detection pattern generator 390 may generate at least two acoustic patterns or detection patterns. The detection pattern generator 390 may output a first detection pattern on first generator output 378 and second detection pattern on second generator output 372. The first detection pattern and second detection pattern are mutually orthogonal. Examples patterns may include chirps, modulated pseudo-random noise sequences, modulated gold codes. The modulation scheme may be a technique used in telecommunication, such as phase-shift keying, frequency-shift keying, or direct sequence spread spectrum.

The detection pattern generator 390 may be implemented as a hardware module or software and hardware for example software executable on a DSP or other microprocessor. The audio system 350 may receive information about the speed of the vehicle on speed sensor input 376. When the car is moving faster than a predefined speed, for instance 5 km/h or 10 km/h, the detection patterns may be added to the normal audio channels using the first adder 368 and the second adder 362 by closing the first switches 368 and second switch 362. It will be appreciated that the switch function may be implemented in hardware or software.

The audio system 350 may combine the audio signal and detection pattern which are subsequently sent to audio amplifiers 380, 382 and finally drive the vehicle speakers 386, 392. One speaker may be located next to the driver seat and the other speaker next to the passenger front seat.

The acoustic signals including the respective audio signal and detection pattern may be detected for example by smartphone 170 as shown or other mobile devices implementing the methods described herein which may detect the transmitted detect patterns and determine its approximate location of the mobile device within a region of the vehicle cabin and set a mode of operation dependent on the location region when the vehicle is moving.

In some examples the audio system (350) may be connected to a microphone (not shown) and include a pattern detector (not shown). The pattern detector may detect transmitted patterns and if no pattern is detected, the audio system may generate an audible warning or transmit a signal to an in-vehicle display (not shown) to display a warning message. In this example the audio system may check that the generated pattern is being correctly transmitted in order to detect faults or tampering with the audio system. In other examples, the audio system may be connected to a microphone and adjust the amplitude of the generated patterns dependent on the ambient noise level in the vehicle cabin. This may improve the accuracy of locating the mobile device.

Figure 7:
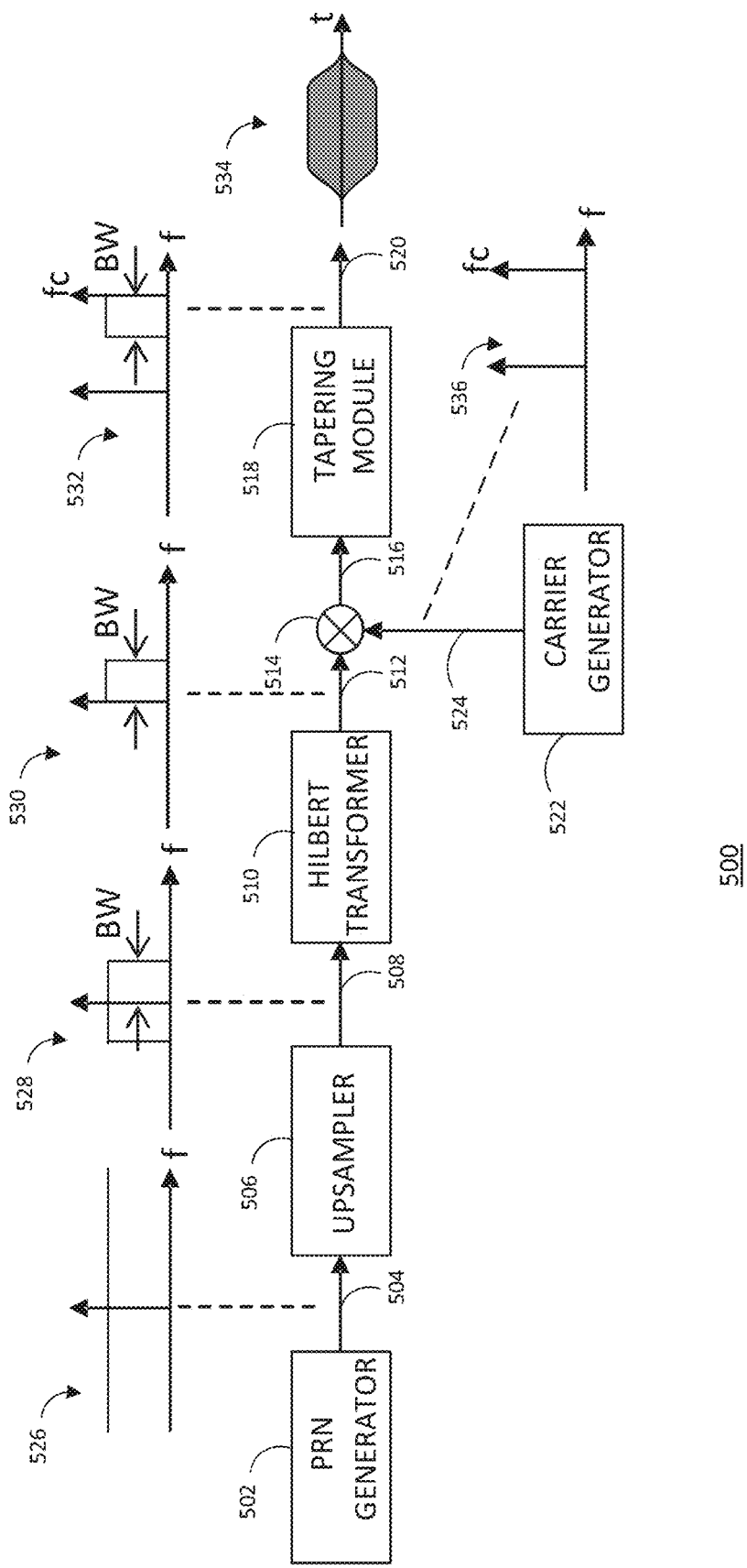
FIG. 7 shows a detection pattern generator for determining the location of a mobile device within a vehicle according to an embodiment.

FIG. 7 illustrates an example of a detection pattern generator 500. pseudo random noise generator 502 may have an output 504 connected to upsampler 506. Upsampler output 508 may be connected to Hilbert transformer 510. Hilbert transformer output 512 may be connected to first input of mixer 514. Carrier frequency generator 522 may have an output 524 connected to a second input of the mixer 514. A mixer output 516 may be connected to tapering module 518. Tapering module output may be connected to detection pattern generator output 520

The pseudo random noise generator 502 may generate a Pseudo-Random-Noise (PRN) pattern, or in particular, a maximum length sequence (MLS) which is a type of PRN. PRNs (including MLSs) have the randomness property of noise, hence they have a white spectrum 526, but they consist of a deterministic sequence of pulses that will repeat itself after a period, therefore can be uniquely generated digitally in hardware or software. An important property of MLSs is that they have very high autocorrelation and very small mutual cross-correlation properties. The inventor has appreciated that generating PRN patterns with different MLSs allows them to be distinguished using a correlation such as matched filtering even when they are simultaneously transmitted.

After being generated, a MLS may contain only a 1-bit stream and have a white frequency spectrum 526. The upsampler 506 may compress the spectrum into a finite bandwidth (BW), for example BW=1.5 kHz to generate a pattern of band from 18.5 to 20 kHz. The upsampler 506 may upsample the signal on PRN output 504 with a ratio of Fs/2/BW, in which Fs is the sampling rate of the system, BW is the desired bandwidth of the detection pattern. The upsampling may result in upsampled frequency spectrum 528. Subsequently, the negative part of the upsampled signal may be removed by the Hilbert transform applied by the Hilbert transformer 510 resulting in frequency spectrum 530. The signal after the Hilbert transformer 510 is the baseband signal. The baseband signal is mixed with a carrier frequency (fc) by mixer 514. The carrier frequency may have frequency spectrum 536 which is the upper bound of the desired frequency, for example 20 kHz. Following mixing by mixer 514, the generated pattern may be tapered by taper module 518. This tapering may remove pop-noise from pulses of the generated pattern. The pulse may be tapered in time domain corresponding to a fade-in and fade-out using a window function, such as a Tukey window. The pattern after mixing by mixer 514 has frequency spectrum 532. The time-domain graph 534 illustrates the envelope of a tapered signal pulse corresponding to the generated detection pattern. In some examples the taper module 518 may be removed.

The patterns generated for transmission on different speakers may be generated sequentially or simultaneously and the generation may be duty-cycled with repeating interval of for example a few seconds to a few tens of seconds. This duty cycle may correspond to the duty cycle to check if a texting phone app is used by someone sitting on the driver seat. This checking frequency does not need to be high, to reduce power consumption and computation resources on the phone. The checking frequency should still be sufficient to prevent continuous and convenient usage of the app. If sequentially transmitted, the timing offset between the patterns may be fixed and predetermined.

A method and apparatus of determining the position of a mobile device in a region of a vehicle cabin are described. The mobile device has a speaker and at least one microphone. The vehicle has an audio system comprising at least two speakers. The mobile device detects first and second acoustic signals respectively transmitted via the first and second vehicle speaker. The acoustic signals comprise a respective detection pattern. The detection patterns are mutually orthogonal. The detected acoustic signals may be compared or correlated with the detection patterns and a respective matched acoustic signal generated. The location of the mobile device within a region of the vehicle cabin may be determined based on the time difference of arrival of the first matched acoustic signal and the second matched acoustic signal. The mode of operation of the mobile device may be set or changed dependent on the location of the mobile device.

In some example embodiments the set of instructions/method steps described above are implemented as functional and software instructions embodied as a set of executable instructions stored on a non-transitory, tangible computer readable storage medium which are effected on a computer or machine which is programmed with and controlled by said executable instructions, Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

What is claimed is:

1. A mobile device locator configured to be included in a mobile device, the mobile device locator comprising:
   a correlator configured to:
      receive first and second acoustic signals respectively transmitted via first and second speakers located in a vehicle cabin;
      compare the detected first and second acoustic signals with respective predetermined first and second detection patterns;
      to output a respective first matched acoustic signal and a second matched acoustic signal, wherein the first detection pattern and the second detection pattern are mutually orthogonal; and
      to detect a check detection pattern included in a check acoustic signal transmitted by the mobile device;
   a time difference of arrival module coupled to the correlator output and configured to determine a time difference of arrival between the first matched acoustic signal and the second matched acoustic signal;
   a location region indicator coupled to the time difference of arrival module and configured to determine a location of the mobile device within a region of the vehicle cabin based on the determined time difference of arrival and to output a mobile device operating mode signal dependent on the determined mobile device location; and
   a received signal strength indicator coupled to the correlator and the location region indicator, the received signal strength indicator configured to determine a received signal strength of the check detection pattern, the location indicator configured to indicate a fault in response to the received signal strength of the check detection pattern being below a predetermined threshold value.

2. The mobile device locator of claim 1 further comprising a received signal strength indicator coupled to the correlator and the location region indicator and configured to: determine a received signal strength of the first and second acoustic detection patterns from the first matched acoustic signal and the second matched acoustic signal; and wherein the mobile device locator is further configured to determine the mobile device location based on the received signal strength and the time difference of arrival of the first and second acoustic detection patterns.

3. The mobile device locator of claim 1 further wherein the time difference of arrival module is further configured to
   determine a first time value from a cross-correlation of the first acoustic signal and the first detection pattern; and
   determine a second time value from a cross-correlation of the second acoustic signal and the second detection pattern; and determine the difference between the first time value and the second time value.

4. The mobile device locator of claim 3 wherein the time difference of arrival module is further configured to determine the difference between the first time value and the second time value and a time offset value corresponding to the delay between transmitting the first detection pattern and the second detection pattern.

5. The mobile device locator of claim 4 wherein the location indicator is further configured to determine the region of the cabin where the mobile device is located by determining a distance value corresponding to the time difference of arrival multiplied by half the speed of sound.

6. A mobile device comprising at least one microphone and the mobile device locator of claim 1, wherein the at least one microphone is coupled to the mobile device locator and the mobile device is configured to set a mobile device mode of operation dependent on the mobile device operating mode signal.

7. An audio system for a vehicle, the audio system being configured to transmit an acoustic signal for determining the location of a mobile device in a vehicle cabin and comprising:
an audio processor configured to output a first audio signal to a first of a pair of stereo speakers and a second audio signal to a second of a pair of stereo speakers;
a detection pattern generator;
a vehicle speed sensor input configured to receive a vehicle speed value;
wherein the detection pattern generator is configured to generate a first acoustic detection pattern and a second acoustic detection pattern, the first acoustic detection pattern and the second acoustic detection pattern being mutually orthogonal;
and wherein in response to the vehicle speed value exceeding a predetermined threshold, the audio system is configured to combine the first detection pattern with the first audio signal and combine the second detection pattern with the second audio signal and to output a first acoustic signal comprising the first acoustic detection pattern and the first audio signal via a first of a pair of stereo speakers and a second acoustic signal comprising the second acoustic detection pattern and the second audio signal via a second of a pair of stereo speakers.

8. The audio system of claim 7, wherein the first acoustic detection pattern and the second acoustic detection pattern comprise a pseudo random pattern having a respective first maximal length sequence and second maximal length sequence.

9. The audio system of claim 7 wherein the first acoustic detection pattern and the second acoustic detection pattern are generated sequentially with a predetermined time offset.

10. The audio system of claim 7 wherein the detection pattern generator comprises a series arrangement of a pseudo random number generator, an up-sampler and a Hilbert transformer, wherein the output of the Hilbert transformer is coupled to a first mixer input and a carrier signal generator is coupled to the second signal input and wherein the detection pattern generator output is coupled to the mixer output.

11. The audio system of claim 7 further comprising a microphone input coupled to the pattern generator and configured to be coupled to a microphone located in the vehicle cabin and wherein the audio system is configured to alter the amplitude of the first detection pattern and the second detection pattern dependent on the detected ambient noise level of the vehicle cabin.

12. The audio system of claim 7 further comprising a microphone input coupled to the pattern generator and configured to be coupled to a microphone located in the vehicle cabin, wherein the pattern generator is further configured to compare the generated patterns with a detected acoustic signal comprising the detected patterns and to generate a signal indicating an error condition in response to the signal strength of the detected patterns being below a predetermined threshold.

13. An apparatus for determining the location of a mobile device within a region of a vehicle cabin, the apparatus comprising the audio system of claim 7.

14. A method of determining the position of a mobile device in a region of a vehicle cabin, the mobile device comprising a speaker and a microphone, the vehicle cabin comprising at least two speakers, the method comprising:
detecting by the mobile device microphone first and second acoustic signals respectively transmitted via the first and second speaker, the first and acoustic signals comprising a respective first detection pattern and a second detection pattern, wherein the first detection pattern and the second detection pattern are mutually orthogonal;
generating a signal indicating an error condition in response to a signal strength of the detected patterns being below a predetermined threshold;
comparing the detected first and second acoustic signals with the respective predetermined first and second detection patterns and outputting a respective first matched acoustic signal and a second matched acoustic signal;
determining a location of the mobile device within a region of the vehicle cabin based on the time difference of arrival of the first matched acoustic signal and the second matched acoustic signal; and
setting the mode of operation of the mobile device dependent on the location of the mobile device.

15. The method of claim 14 further comprising generating the first detection pattern and the second detection pattern sequentially with a predetermined time offset.

16. The method of claim 14, wherein the first detection pattern and the second detection pattern comprise a pseudo random pattern having a respective first maximal length sequence and second maximal length sequence.

17. The method of claim 14, further comprising altering the amplitude of the first detection pattern and the second detection pattern based on a detected ambient noise level of the vehicle cabin.

18. The method of claim 14, further comprising comparing the generated patterns with a detected acoustic signal comprising the detected patterns.

19. The method of claim 14, further comprising determining signal strength of the detected patterns from the first matched acoustic signal and the second matched acoustic signal.

20. The method of claim 14, wherein the setting the mode of operation of the mobile device dependent on the location of the mobile device includes outputting a mobile device operating mode signal dependent on the location of the mobile device.

* * * * *